United States Patent [19]

Tanner

[11] Patent Number: 4,772,656
[45] Date of Patent: Sep. 20, 1988

[54] VOLATILE AROMATIC BARRIER FOR POLYOLEFIN CONTAINERS

[75] Inventor: David J. Tanner, Oshawa, Canada

[73] Assignee: Linwo Industries Limited, Agincourt, Canada

[21] Appl. No.: 941,569

[22] Filed: Dec. 11, 1986

Related U.S. Application Data

[62] Division of Ser. No. 769,976, Aug. 27, 1985, abandoned.

[51] Int. Cl.$^4$ .................... C08K 3/08; B65D 23/00
[52] U.S. Cl. .................... 524/441; 264/331.15; 428/35
[58] Field of Search ............ 215/16; 428/35; 524/441; 264/108, 24, 331.15, 523

[56] References Cited

U.S. PATENT DOCUMENTS

| | | | |
|---|---|---|---|
| 2,054,454 | 9/1936 | Thies et al. | 106/23 |
| 4,599,376 | 7/1986 | Takimoto et al. | 524/411 |
| 4,696,857 | 9/1987 | Sibilia et al. | 428/323 |

FOREIGN PATENT DOCUMENTS

| | | |
|---|---|---|
| 590746 | 1/1960 | Canada . |
| 796377 | 10/1968 | Canada . |
| 867812 | 4/1971 | Canada . |
| 0621695 | 8/1978 | U.S.S.R. . |

*Primary Examiner*—John E. Kittle
*Assistant Examiner*—James J. Seidleck
*Attorney, Agent, or Firm*—Banner, Birch, McKie & Beckett

[57] ABSTRACT

A molded polyolefin container for hydrocarbons having improved barrier to permeation of fluid hydrocarbons through the walls of the container is disclosed. The container walls comprise from 0.1% to 2% by weight of aluminum powder in the polyolefin container walls. The aluminum powder is substantially uniformly distributed throughout the polyolefin container walls. The polyolefin may be polyprolylene or polyethylene. This type of container provides an economical packaging system for hydrocarbons compared to existing packages of metal or polyvinylchloride.

13 Claims, No Drawings

VOLATILE AROMATIC BARRIER FOR POLYOLEFIN CONTAINERS

This application is a division of application Ser. No. 769,976, filed Aug. 27, 1985, now abandoned.

FIELD OF THE INVENTION

This invention relates to containers for fluid hydrocarbons which have incorporated in their container walls a barrier to the permeation of fluid hydrocarbons.

BACKGROUND OF THE INVENTION

Uses for molded plastic containers is expanding rapidly. However, certain problems arise with respect to containing some types of products in various types of plastic containers. Fluid hydrocarbons present a particular problem in this area. However, in the consumer market fluid hydrocarbons are sold extensively. Therefore, there is a need for a molded plastic container which can effectively contain fluid hydrocarbons to replace the rather expensive yet more reliable metal type of container for fluid hydrocarbons. For example, the use of polyethylene and polypropylene to contain hydrocarbons has always been considered less than satisfactory due to excessive permeation of product through the container wall. As a result the containers deform badly in storage prior to sale. This deformation is normally referred to as "panelling" in the industry. Extra product has to be incorporated into the containers when filled to give a product shelf life which complies with government weights and measures guidelines to allow for normal stock rotation periods. Even if these major drawbacks are accepted in the marketplace, obviously the shelf and storage areas for such containers will have a finite amount of vapors emerging from the containers due to permeation. This requires that the packages for the hydrocarbons be stored or sold in an area which is remote from areas of food handling.

Polyvinylchloride containers exhibit acceptable barrier properties to reduce permeation of hydrocarbons through the container walls, thereby providing a plastic container alternative to the metal container. However, the disadvantages in the use of polyvinylchloride are its cost, that is, twice as expensive as polyolefins and ecologically the plastic is considered to be environmentally unsafe due to the disposal of empty used polyvinylchloride containers in domestic refuse. This is a cause of concern in waste disposal when the product is burned.

Another alternative to plastic containers having hydrocarbon barrier properties is to treat the plastic or incorporate into the plastic a laminate layer which constitutes a barrier to the hydrocarbons. Either technique is very expensive. For example, surface treating of polyolefins by fluorination or sulphonation is very expensive, albeit providing excellent improvement in barrier properties to the permeation of hydrocarbons. A drawback in the fluorination and sulphonation of such containers is that on disposal there are similar environmental concerns as with polyvinylchloride containers that harmful gases can be given off during incineration. The incorporation of metallic films or the like in a laminate structure of a plastic container to provide a barrier may result in a useful product; however, again very costly to manufacture compared to polyolefin containers.

It has been discovered that the incorporation of aluminum fines or powder in polyolefin used in the molding of containers considerably improves the barrier properties of polyolefins to the permeation of fluid hydrocarbons through the container walls. Aluminum has been incorporated in polyolefins in the past, although for distinctly different purposes such as improving tensile and impact strength of the polyolefin or resisting ultraviolet and oxidative degradation of the polyolefins. Examples of these systems are disclosed in U.S. Pat. Nos. 3,567,607 and 3,371,062. In order to improve the tensile and impact strength of molded items, such as cups, as disclosed in U.S. Pat. No. 3,567,607, at least forty volume percent of finely divided metallic particles, such as aluminum, having an average size from about 5 microns to 300 microns is incorporated into the polyolefin. In U.S. Pat. No. 3,371,062, aluminum powder is incorporated into polypropylene in the range of approximately 1 to 5 weight percent to resist ultraviolet and oxidative degradation and thermoexpansion. The aluminum powder includes a suitable lubricant having the ability to orient the flakes of aluminum powder in parallel layers to provide for this resistance in the polyolefin which, according to this patent, is commonly used in the manufacture of polypropylene pipe, rope, fibres and the like.

U.S. Pat. No. 3,224,997 discloses the incorporation of aluminum pigment in a titanium dioxide filled polyolefin composition to improve the opacity and color characteristics of the polyolefin manufactured item. It is suggested that the preferred concentration of aluminum powder in the composition be in the range of 0.01% to 0.1% to provide improved colored characteristics for light and pastel items, including white items. For darker colored items, where impact requirements are not stringent, it is suggested that aluminum powder may be incorporated into the polyolefin titanium dioxide system in approximately 0.01% to 0.3% by weight of the total composition.

Aluminum fines and/or powders have also been incorporated in various plastic compositions to provide a silver or metallized decorative appearance to plastic bottles. To accomplish this effect, at least 0.6% or greater by weight of aluminum powder is incorporated into the plastic to provide the metallized, sparkly, ornamentive effect on the bottle wall.

Aluminum fines have also been used in polypropylene molded materials to provide improved solvent resistance and thermal stability. It has been known for some time that various types of solvents cause swelling in polypropylene materials which is entirely unsatisfactory when polypropylene is used as a gasket in areas exposed to solvents. Canadian Pat. No. 825,741 discloses the incorporation of approximately 5 to 90 parts by weight of a finely divided aluminum powder in a polypropylene molded article to provide the necessary thermo stability and anti-swelling characteristics due to solvent exposure to enable the use of polypropylene as a gasket material. However, in this patent, as in any of the above discussed patents, no consideration is given to the use of aluminum powder in polyolefins to improve resistance of the polyolefins to permeation of fluid hydrocarbons through walls of containers for the fluid hydrocarbons.

SUMMARY OF THE INVENTION

According to an aspect of the invention, a molded polyolefin container for hydrocarbons having improved barrier to permeation of fluid hydrocarbons through walls of the polyolefin container comprises from 0.1% to 0.5% by weight of aluminum powder in the polyolefin for the container walls. The aluminum powder is substantially, uniformly distributed throughout the polyolefin container walls.

The polyolefin may be of the many well known varieties of polypropylene or polyethylene which are suitable for containing fluid hydrocarbons, such as mineral spirits, solvents or oil.

According to another aspect of the invention, in a process of molding a container from thermoplastic polyolefin resin, the improvement comprises incorporating into the polyolefin resin 0.1% to 0.5% by weight of aluminum powder. The aluminum powder is substantially uniformly distributed throughout the polyolefin resin which may be polypropylene or polyethylene.

According to another aspect of the invention, a sealed container having therein fluid hydrocarbons has walls of polyolefin which comprise 0.1% to 2% by weight of aluminum powder. The aluminum powder increases barrier properties of the polyolefin to permeation of the contained fluid hydrocarbons through the container walls.

DETAILED DESCRIPTION OF THE PREFERRED EMBODIMENTS

A variety of fluid hydrocarbons are sold in the commercial and consumer market. The fluid hydrocarbons are commonly classified as mineral spirits, solvents and oils. Specific examples include barbeque lighter fluid, paint thinners, Varsol (trade mark), household cleaning solvents, Stoddarts solutions, transmission fluids, power steering fluids, hydraulic oils, two-cycle oils, outboard motor oils, snowmobile oils, car engine oils, power chain saw lubrication oils to name only a few. With the lighter solvents, a significant problem is the very quick permeation of the hydrocarbon fluids through the walls of polyolefin containers. In particular, with polyethylene and polypropylene, permeation of the hydrocarbons can be such that the container distorts in shape resulting in an unsightly package for retail product. Furthermore, with various types of heavy oils, permeation of the oils through the containers result in a slippery feel on the container wall and may, if permeation is excessive, result in staining of the shelf surfaces. These problems have necessitated the use of metal containers particularly for the lighter solvents.

I have discovered that, by the incorporation of aluminum powders in polyolefins, the above problems are overcome to a greater degree to provide a container which has sufficiently extended shelf life to provide for the usual terms of product rotation on the shelf. A variety of aluminum powders and fines are usable in the invention. The powders and fines may be of the amorphous particulate structure or platelet structure and may be various types of aluminum and alloys thereof. A variety of sources are available for the aluminum powders and fines. For example, they may be obtained from Atlantic Powdered Metal Inc., Reynolds Metals Inc., Cerac Inc., and Thompson Hayward Chemical Company.

The particles of aluminum may range in size from approximately 10 to 80 microns depending upon the use to which the container is put in containing various solvents and economies of manufacture. The preferred size of particles is in the range of 25 to 60 microns.

The aluminum powders, as incorporated into the polyolefin resin, may vary in concentration from 0.1% up to 2% by weight of the blended mixture of the container wall. Ideally, the aluminum fines are uniformly distributed throughout the polyolefin of the container wall. Although a concentration of aluminum powder in the polyolefin in the range of 0.2 to 1.0% by weight produces improvements. However, it is understood that there will be variations in the distribution of the aluminum fines throughout the polyolefin, thus resulting in a substantially uniform distribution. The governing condition with respect to any variation of aluminum fines in the polyolefin of the container walls is that the concentration is always within the range of 0.1% to 2% by weight of the material of the container wall.

By use of aluminum powders and fines in polyolefins and in particular, polyethylenes and polypropylenes a substantial reduction in the permeation of fluid hydrocarbons through the container walls is realized. With most types of polyethylene and polypropylenes, the incorporation of aluminum powders in the materials results in a reduction in permeation of fluid hydrocarbons of up to approximately 40%. Preferred range for the concentrations of the aluminum powders in the polyolefins to optimize the decrease in permeation of fluid hydrocarbons through the container walls is in the range of 0.2% to 0.5%, particularly for various types of aromatic mineral spirits.

By use of the aluminum fines in polyolefins to accomplish an acceptable hydrocarbon barrier, use of the more costly metal and polyvinylchloride types of containers is avoided. Based on present world market prices for polyvinylchloride versus polyethylene and polypropylene, a saving of approximately one half is realized in substituting polyolefin bottles for polyvinylchloride. Furthermore, polyolefins possess very good low temperature stability in resisting low temperature stress cracking and the like which is a superior advantage over polyvinylchlorides which tend to exhibit low temperature stress cracking properties.

The thickness of the polyolefin in which the aluminum powder is contained may vary considerably depending upon the size of the container, its end use and the economic viability of the product. The wall of the polyolefin container may be made up in its entirety of the polyolefin admixed with the aluminum powder. Alternatively, the wall of the container may be of multi-laminate construction where a layer of the multi-laminate wall is of a polyolefin admixed with aluminum powder. Minimum thicknesses for the layer or wall of polyolefin with aluminum is normally in the range of 15/1000 of an inch depending upon the construction and end use of the container. For normal containers of the one liter size or greater, a minimum wall thickness of 25/1000 of an inch is preferred. The upper limit on the thicknesses for the layer or wall of the container, as noted, depends greatly on the end use for the product and the wall structural, physical characteristics. However, upper limits for the wall thicknesses are in the range of 60/1000 of an inch. Various grades of polyethylene and polypropylene are useful as examplified in the following Examples. Insofar as polyethylene is concerned, low, medium, high and super high density polyethylene are useful. High density polyethylene has a specific gravity in the range of 0.93 to 0.95 and super high density polyethylene has a specific gravity in the range of 0.96 to 0.965. A variety of sources of these resins are available. For example, the Dow resins having grade numbers 36054, 36056, 69065-P, XS8464804 are useful. An additional resin is available from Paxon AA60003. Resins are also available from Union Carbide Company Limited and given resins number 5230, 5250 and E678-002.

Preferred embodiments of the invention are exemplified in the following Examples.

EXAMPLE 1

350 ml. long neck bottles were molded from polyethylene resin type D1 Dow HDPE 36054. The bottles had an average empty weight of 26 g. and an average wall thickness of 0.025 inches. A color additive of titatium dioxide to provide a white pigment in the resin was incorporated. The percent by weight of additive incorporated was 2%. The bottles were filled with mineral spirits having a variation in percentage of aromatics. Weight loss tests were performed on the bottles by subjecting the bottles to oven storage at 50° C. and determining the weight loss at various periods during the tests. Percent weight loss is expressed in terms of weight loss from the bottle at the predetermined periods of measurement. The results of the tests are shown in Table 1.

TABLE 1

| Mineral Spirits | % Wt. Loss, Days at 50° C. | | | |
|---|---|---|---|---|
| % Aromatic | 10 | 20 | 30 | 40 |
| 16 | 7.5 | 12.0 | 19.9 | 24.9 |
| 5 to 8 | 5.2 | 10.8 | 14.2 | 16.4 |
| 2 to 4 | 3.2 | 6.7 | 9.9 | 13.3 |
| 0.4 | 1.9 | 4.5 | 7.0 | 8.5 |

EXAMPLE 2

500 ml. long neck bottles were molded from a polyethylene resin type D1 containing approximately 2% by weight of titanium dioxide pigment. The average empty weight of the bottles was 42 g. with an average wall thickness of 0.033 inches. The bottles were loaded with mineral spirits containing varying percentages of aromatics. The results of the weight loss tests are shown in Table 2.

TABLE 2

| Mineral Spirits | % Wt. Loss, Days at 50° C. | | | |
|---|---|---|---|---|
| % Aromatic | 10 | 20 | 30 | 40 |
| 16 | 3.7 | 7.4 | 10.9 | 16.2 |
| 5 to 8 | 3.1 | 6.2 | 9.0 | 12.6 |
| 2 to 4 | 3.2 | 6.0 | 9.2 | 12.9 |
| 0.4 | 2.1 | 5.5 | 6.5 | 8.9 |

EXAMPLE 3

1 liter bottles were molded from a polyethylene resin type D1 comprising 2% by weight of titanium dioxide pigment. The average bottle weight was 69 g. with an average wall thickness of 0.038 inches. The bottles were loaded with mineral spirits of varying percentages of aromatics and tested for weight loss. The results of the tests are shown in Table 3.

TABLE 3

| Mineral Spirits | % Wt. Loss, Days at 50° C. | | | |
|---|---|---|---|---|
| % Aromatic | 10 | 20 | 30 | 40 |
| 16 | 2.5 | 5.9 | 8.0 | 12.8 |
| 5 to 8 | 2.2 | 5.4 | 7.5 | 11.7 |
| 2 to 4 | 1.9 | 5.3 | 7.2 | 11.6 |
| 0.4 | 1.5 | 4.7 | 6.8 | 11.2 |

EXAMPLE 4

1 liter bottles were molded from a polyethyelene resin type D2 Dow HDPE 36056. The resin included varying concentration of titanium dioxide pigment. The average bottle weight was 70 to 100 g. with an average wall thickness varying from 0.040 inches to 0.056 inches. The concentration of aromatics in the mineral spirits loaded into the bottles was 16%. The bottles were tested with the following results.

TABLE 4

| % White Pigment | Bottle Wt. (g.) | Avge. Wall | % Wt. Loss, Days at 50° C. | | | |
|---|---|---|---|---|---|---|
| | | | 10 | 20 | 30 | 40 |
| 2 | 70.9 | 0.040" | 4.4 | 9.0 | 14.2 | 16.6 |
| 1 | 81.1 | 0.046" | 2.4 | 5.2 | 7.6 | 10.8 |
| 1.5 | 90.7 | 0.050" | 3.0 | 6.5 | 10.4 | 12.8 |
| 2 | 100.7 | 0.056" | 2.0 | 4.8 | 10.4 | 9.0 |

EXAMPLE 5

1 liter bottles were molded from polyethylene resin type D2. Varying percentages of additives were incorporated in the resin for making the bottle. The average bottle weight ranged from 70 to 100 g. with an average wall thickness of 0.038 inches to 0.056 inches. The concentration of aromatics in mineral spirits loaded into the bottles was 16%. The results of the test for weight losses are as follows:

TABLE 5

| Additive | % Additive | Bottle. Wt. (g.) | % Wt. Loss, Days at 50° C. | | | |
|---|---|---|---|---|---|---|
| | | | 10 | 20 | 30 | 40 |
| Yellow | 2 | 71.1 | 3.8 | 8.0 | 12.0 | 15.8 |
| Yellow | 2 | 80-90 | 3.0 | 5.4 | 10.4 | 13.0 |
| Yellow | 2 | 101.3 | 2.0 | 4.0 | 6.8 | 10.0 |
| None | Nil | 70.5 | 3.6 | 7.2 | 11.8 | 15.4 |
| None | Nil | 80-90 | 2.4 | 5.3 | 9.2 | 11.6 |
| None | Nil | 101.3 | 2.0 | 4.3 | 6.4 | 8.8 |
| Blue | 2 | 68.5 | 3.4 | 7.4 | 11.0 | 16.0 |
| Alum. | 0.54 | 71.7 | 2.6 | 6.0 | 9.0 | 14.0 |

EXAMPLE 6

500 ml. long neck bottles were molded from various resin types with various concentrations of additives in the resin before making the bottles. The bottle weights were in the range of 45 g. and loaded with mineral spirits containing 7% aromatics. The tests results for percent weight loss of these bottle constructions are as follows:

TABLE 6

| Resin Type | Additive | % Additive | Bottle Wt. (g) | % Wt. Loss 35 days at 50° C. |
|---|---|---|---|---|
| D2 | White | 2.0 | 46.4 | 11.2 |
| C2 | White | 2.0 | 44.8 | 9.1 |
| C2 | Alum | 0.54 | 45.6 | 8.5 |
| C2 | Alum | 2.08 | 44.5 | 8.9 |
| C2 | Alum | 2.16 | 44.2 | 10.1 |
| C2* | Alum | 3.24 | 47.3 | 10.1 |

*Union Carbine DMDY 5250

EXAMPLE 7

1 liter bottles were molded from resin type C2. Varying concentrations of additives were incorporated into the resin prior to bottle molding. The bottles were loaded with mineral spirits containing 7% aromatics. The tests results for weight loss are as follows:

TABLE 7

| Additive | % Additive | Bottle. Wt. (g.) | % Wt. Loss, Days at 50° C. 10 | 20 | 30 |
| --- | --- | --- | --- | --- | --- |
| Blue | 2.0 | 65.1 | 2.0 | 4.3 | 7.1 |
| Alum | 0.54 | 64.3 | 1.4 | 3.4 | 5.9 |
| Alum | 1.08 | 63.7 | 1.9 | 3.9 | 6.3 |
| Alum | 2.16 | 62.9 | 2.8 | 5.0 | 8.4 |

EXAMPLE 8

The various types of bottles molded, in accordance with Examples 1 through 7, were measured to provide the following bottle statistics.

TABLE 8

| Bottle Type | Area of Surface Sq. Cm. | Surface Area Sq. Cm. per Ml. Contents | SA/ml As % of 350 ml. Bottle |
| --- | --- | --- | --- |
| Long neck 350 ml. | 330.8 | 0.95 | 100 |
| Long neck 500 ml | 426.0 | 0.85 | 89 |
| Short neck 500 ml. | 410.2 | 0.82 | 86 |
| Std. 1 liter | 715.4 | 0.72 | 76 |

EXAMPLE 9

Overall permeations statistics of a variety of bottles made in accordance with Examples 1 through 7 were tested based on varying percentages of aromatics in the mineral spirits loaded into the containers which were made from a variety of resin types. To provide a consistent comparison of the effectiveness of the polyolefins in acting as barriers to the permeation of fluid hydrocarbons, a permeation factor was calculated for each test. The permeation factor is expressed as percent loss per square centimeter surface area per milliliter of contents per wall thicknesses in centimeters. The statistics of Table 8 were used in providing the calculations for the permeation factor. The results of the tests on various types of bottles are as follows:

TABLE 9

| Bottle Type | Additive Conc. in % By. Wt. | Bottle Wt. G. | Resin Type | % Aromatic in Product | Permeation Factors Days at 50 C. 10 | 20 | 30 | 40 |
| --- | --- | --- | --- | --- | --- | --- | --- | --- |
| 350 ml. long | 2 - White | 29 | D1 | 16 | 0.51 | 0.81 | 1.32 | 1.68 |
| 500 ml. long | 2 - White | 42 | D1 | 16 | 0.36 | 0.74 | 1.07 | 1.60 |
| 1 Liter | 2 - White | 69 | D1 | 16 | 0.33 | 0.79 | 1.07 | 1.73 |
| 1 Liter | 2 - White | 71 | D2 | 16 | 0.61 | 1.27 | 2.01 | 2.34 |
| 1 Liter | 2 - White | 101 | D2 | 16 | 0.41 | 0.94 | 2.06 | 1.78 |
| 1 Liter | None | 71 | D2 | 16 | 0.48 | 1.07 | 1.57 | 2.06 |
| 1 Liter | 2 - Blue | 69 | D2 | 16 | 0.43 | 0.91 | 1.35 | 1.98 |
| 1 Liter | 0.54 - Alum | 72 | D2 | 16 | 0.36 | 0.81 | 1.22 | 1.88 |
| 1 Liter | 1.5 - White | 90 | D2 | 7 | 0.36 | 0.76 | 1.17 | 1.52 |
| 500 ml. Std. | 2 - White | 30 | D2 | 16 | 0.36 | 1.04 | 1.22 | 1.60 |
| 500 ml. Std. | 0.54 - Alum | 49 | D2 | 16 | 0.28 | 0.81 | 0.94 | 1.24 |
| 500 ml. long | 2 - White | 46 | D2 | 7 | | | 1.02 | |
| 500 ml. long | 2 - White | 45 | C2 | 7 | | | 0.81 | |
| 500 ml. long | 0.54 - Alum | 46 | C2 | 7 | | | 0.60 | |
| 1 Liter | 2 - Blue | 65 | C2 | 7 | 0.25 | 0.53 | 0.89 | |
| 1 Liter | 0.54 - Alum | 64 | C2 | 7 | 0.18 | 0.41 | 0.71 | |
| 1 Liter* | 2 - White | 65 | C2 | 7 | 0.35 | 0.74 | 1.33 | |

*calculated from above ratios.

The results set out in Tables 1 through 4 demonstrate the effect in different size containers that different resin sources and different concentrations of pigment have on the permeation of fluid hydrocarbons through containers of well known prior art types of wall construction. All of the bottles itemized in the Examples 1 through 4 have excessive weight loss which is unsatisfactory for commercial and consumer market.

The results of Table 5 demonstrate the improvement with respect to the use of aluminum powder in the resin compared to various types of pigments used in bottle resins when considering the bottle wall thickness. For a nominal thickness of a bottle wall containing the aluminum powder, the bottle weighs 71.7 g. Upon inspection of the approximate reduction in percent permeation over the test period for bottles of all approximately the same size, i.e., roughly same wall thickness, the bottle containing the aluminum powder provides an approximate 2 to 5% reduction in permeation. Based on the manner in which the tests were conducted, as outlined in Examples 1 through 9, this results in a very significant extension of shelf-life for the product. For example, with respect to Table 5, bottles not containing aluminum powder in the walls achieve a permeation rate usually ten days earlier than the permeation characteristic achieved by bottles with aluminum. This ten day difference can equate to an extended shelf life of three months or more. For example, the weight loss of hydrocarbon determined at 50° C. in one day is equivalent to a weight loss of product due to permeation of 9 days at 20° C.

Example 6 demonstrates the significant effect the use of aluminum powder in the resin has on weight loss of hydrocarbons over the test period. It further demonstrates that increasing the concentration of aluminum in the resin results in a loss of barrier properties to the permeation of hydrocarbons, thereby placing an upper limit on the useful amount of aluminum powders to provide a useful hydrocarbon barrier. This is further exemplified in Example 7 using a different resin type and bottle size. As demonstrated in these Examples, the optimum concentration of aluminum powder in the polyolefin is in the range of 0.5% by weight.

With reference to Example 9, the permeation factors reveal the significant improvement in hydrocarbon barrier properties by the use of aluminum within the concentration ranges of this invention compared to similar bottles with other pigments or no additives.

It is apparent from these Examples that at levels above 2% of aluminum powder in the resin results in an interference effect which reduces the barrier properties of the polyolefin, whereas at concentration levels below 2% and preferably above 0.5%, the desired hydrocarbon barrier of properties are achieved.

Although preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A method of improving the resistance of a molded polyolefin container to permeation by a fluid hydrocarbon contained by the container, comprising:
   (a) uniformly distributing 0.1 to 2 wt.% aluminum powder throughout a polyolefin resin; and
   (b) molding the resin to form the container.

2. The method of claim 1, wherein the polyolefin resin comprises polypropylene.

3. The method of claim 1, wherein the polyolefin resin comprises polyethylene.

4. The method of claim 1, wherein the aluminum powder has a particle size in the range of 10 to 80 microns.

5. The method of claim 4, wherein the aluminum powder has a particle size in the range of 25 to 60 microns.

6. The method of claim 1, wherein 0.1 to 1 wt.% aluminum powder is uniformly distributed throughout the polyolefin resin.

7. The method of claim 1, wherein 0.2 to 0.5 wt.% aluminum powder is uniformly distributed throughout the polyolefin resin.

8. The method of claim 1, wherein about 0.5 wt.% aluminum powder is uniformly distributed throughout the polyolefin resin.

9. The method of claim 3, wherein the polyethylene is selected from the group consisting of low density, medium density, high density and super high density polyethylenes.

10. The method of claim 1, wherein the fluid hydrocarbon is selected from the group consisting of aromatic mineral spirits, solvents, Stoddart solutions, transmission fluids, power steering fluids and oil type hydrocarbons.

11. The method of claim 1, wherein the walls of the container have a thickness in the range of 0.015 inch to 0.060 inch.

12. The method of claim 11, wherein the container wall thickness is in the range of 0.025 inch to 0.050 inch.

13. A method of improving the resistance of a molded polyolefin container to permeation by a fluid hydrocarbon contained by the container, comprising:
   (a) mixing 0.1 to 2 wt.% aluminum powder into a polyolefin resin until the powder is uniformly distributed throughout the resin; and
   (b) molding the power and resin mixture to form the container.

* * * * *